July 29, 1941.  D. G. SMELLIE  2,250,970

REFRIGERATION

Filed April 25, 1938   2 Sheets-Sheet 2

INVENTOR
Donald G. Smellie
BY
Harry S. Dumass
ATTORNEY

Patented July 29, 1941

2,250,970

UNITED STATES PATENT OFFICE 2,250,970

REFRIGERATION

Donald G. Smellie, Canton, Ohio, assignor to The Hoover Company, North Canton, Ohio, a corporation of Ohio Application April 25, 1938, Serial No. 204,019

13 Claims. (Cl. 62—119.5)

This invention relates to absorption refrigerating systems and more particularly to a novel absorber structure adapted for use therein and to a novel arrangement and combination of the parts of such system.

Previous refrigerating systems have a number of disadvantages due to the nature of the absorber structure and to the arrangement of the parts of the system within the refrigerating cabinet. In particular, the arrangement requires that too large a percentage of the available space within the refrigerating cabinet be utilized to house the mechanism of the refrigerating system. This undesirable result flows partly from the nature of these mechanisms and partly from the manner in which they are arranged within the refrigerating compartment. Additionally, the absorber is not arranged to provide efficient flow of cooling air thereover and efficient cooling and rejection of the heat of absorption. In previous refrigerating systems the weak solution formed in the boiler is elevated into the top portion of the absorber through which it flows by gravity in counterflow with the pressure equalizing medium refrigerant vapor mixture and the resulting strong solution is collected in the lower part of the absorber. The strong solution is then drained into the analyzer. As a result of this arrangement it is necessary that the lowest part of the absorber be above the highest part of the boiler-analyzer system, and, as a consequence, the total height of the mechanism compartment of the refrigerator must be at least equal to the sum of the individual heights of the boiler analyzer and of the absorber. The combination of these two heights being large requires an excessively large cabinet and also requires that an excessive amount of the space in the cabinet be given over to housing the mechanism, thereby cutting down the available space in any given cabinet for use as a refrigerating compartment. Another consequence of this arrangement is that the solution pump must elevate the solution a distance equal to the combined total of the heights of the boiler-analyzer and absorber. Furthermore, previous absorption refrigerating systems necessarily position the absorber in such fashion that it either throttles the flow of cooling air thereover by interposing a tortuous path to the air or the absorber is not positioned so as positively to be swept by the major portion of the cooling air entering the customary cooling flue in the cabinet. The net result of these disadvantages is that present refrigerating cabinets are too large in proportion to the available refrigerating space and the cooling capacity of the system is not utilized efficiently.

Accordingly, it is an object of the present invention to provide an absorption refrigerating system having a compact boiler-analyzer absorber assembly the total height of which does not substantially exceed the height of the boiler-analyzer itself thereby permitting the use of a shallow mechanism compartment and consequently largely increasing the percentage of space available for refrigerating compartment in any given size cabinet.

It is a further object of this invention to provide an absorption refrigerating system in which the various parts thereof are arranged in a cabinet in such fashion that cooling air has a free path of flow over the absorber and through the cooling air flue without being forced to follow a tortuous high resistance path of flow.

It is a further object of the invention to provide a refrigerating system of the absorption type including a boiler-analyzer absorber system in which the weak solution flows by gravity from the boiler into the absorber through which it passes in a substantially horizontal path to absorb the refrigerant vapor formed in the evaporator, and it is then elevated in the absorber to an elevation from which it may flow by gravity into the analyzer.

It is another object of this invention to provide an absorption refrigerating system having an absorber structure which permits the system to be air cooled, which simultaneously circulates the absorption solution and the inert gas through their circuits, which simultaneously creates sprays through which the inert gas is forced to pass, and which rejects the heat of absorption to the surrounding atmosphere. The absorber designed according to the invention is particularly advantageous for the reason that it occupies a minimum of space, particularly in a vertical direction, thereby permitting the mechanism compartment beneath the refrigerating compartment to be of minimum height, and it also permits the air cooling flue, normally positioned at the rear of the refrigerating cabinet, to be very narrow thereby effecting a further saving in the total space occupied by the refrigerator.

It is a further object of the invention to provide improved fluid circulating means which may be hermetically sealed in an absorber of an absorption refrigerating system and which in addition to causing both the gas and the liquid to flow in a desired direction through the absorber brings the gas and liquid into very intimate contact and throws them about and in contact with each other and with the inside of the absorber vessel so as to improve the absorption and aid in the transfer of heat of absorption to some heat absorbing medium on the outside of the vessel such as the atmosphere.

It is another object of the invention to provide an absorber for a refrigerating system with power driven means which may be hermetically sealed therein and which causes liquid to flow or be lifted within the absorber while coming in contact with gas.

Other objects reside in certain novel features of the arrangement and construction of parts as will be apparent from the following description taken in connection with the accompanying drawings in which.

This application is a continuation-in-part of my co-pending application Serial No. 87,165, filed June 25, 1936.

Figure 1:
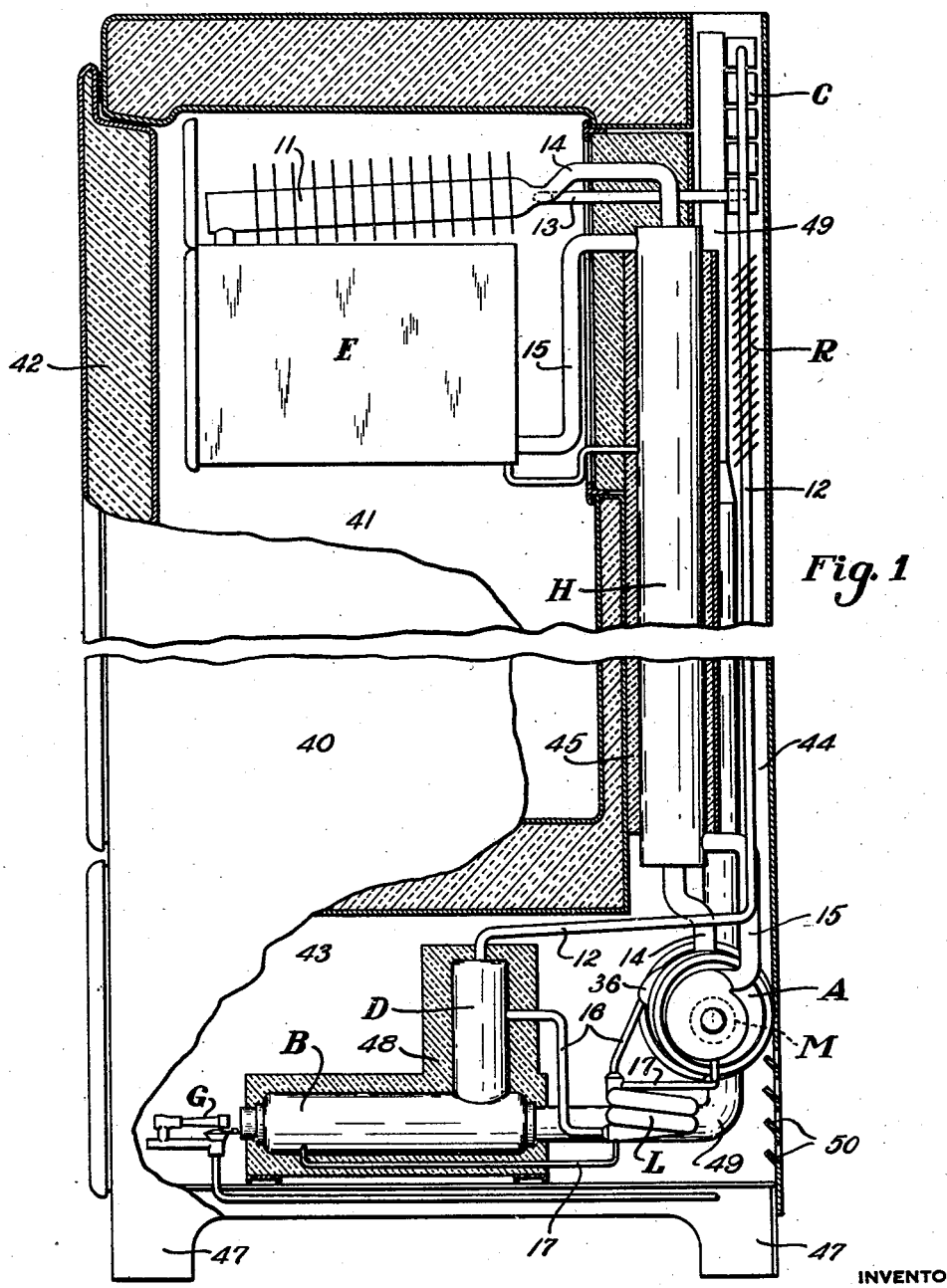
Figure 1 illustrates a refrigerating system embodying my invention in a cabinet.

Referring now to the drawing in detail and first to Figure 1 thereof, there is illustrated a continuous absorption refrigerating system consisting of a boiler B, an analyzer D, an air cooled rectifier R, a tubular air cooled condenser C, an evaporator E, a gas heat exchanger H, an absorber A, and a liquid heat exchanger L, all of which are suitably connected by various conduits to form a complete hermetically sealed refrigerating system including a number of subsidiary gas and liquid circuits to which reference will be made hereinafter.

The refrigerating system just outlined will be charged with a suitable refrigerant, such as ammonia, a suitable absorbent, such as water, and an inert pressure equalizing medium, such as nitrogen.

The absorber, which also includes a gas circulating fan, is driven by an electrical motor M. The boiler B is heated in any suitable manner as by a gas burner G. The circulating motor M and the gas burner G may be controlled in any suitable manner to regulate the production of refrigeration.

The boiler normally contains a solution of the refrigerant in the absorbent which liberates refrigerant vapor when heated. The refrigerant vapor so liberated passes upwardly through the analyzer D in counterflow relationship to strong absorption solution flowing downwardly therethrough from which further refrigerant vapor is generated by the heat of condensation of absorption solution vapor passing into the analyzer from the boiler. The refrigerant vapor is conducted from the upper portion of the analyzer to the upper portion of the tubular air-cooled condenser C through a conduit 12 which includes an air-cooled rectifier R. The rectifier R causes condensation of any absorption solution vapor which may find its way through the analyzer D and into the conduit 12.

The lean solution formed in the boiler by the generation of refrigerant vapor is conveyed therefrom through a conduit 17, which passes through the liquid heat exchanger L into the bottom portion of the absorber A. In the absorber the lean solution is brought into intimate contact with a pressure equalizing medium refrigerant vapor mixture in order to absorb the refrigerant vapor content of that mixture. Also in the absorber the strong solution is pumped upwardly to a higher elevation and is conducted therefrom through the conduit 16 which passes through the liquid heat exchanger L into the upper portion of the analyzer D. The action occurring in the absorber will be explained in detail hereinafter.

The refrigerant vapor supplied to the condenser C is liquefied by heat exchange with cooling air and is conveyed therefrom through a conduit 13 into the upper or box-cooling section 11 of the evaporator E. The liquid refrigerant flows downwardly through the evaporator in counter-flow relationship with pressure equalizing medium into which the liquid evaporates to produce refrigeration. The lower or ice freezing portion of the evaporator may be enclosed in any suitable form of casing as illustrated. The rich pressure equalizing medium formed in the evaporator is conveyed therefrom to the absorber through a conduit 14 which passes through the gas heat exchanger H. In the absorber the refrigerant vapor content of the pressure equalizing medium refrigerant vapor mixture is absorbed therefrom and the lean pressure equalizing medium is conveyed from the absorber to the bottom portion of the evaporator through a conduit 15 which also passes through the gas heat exchanger H.

Figure 2:
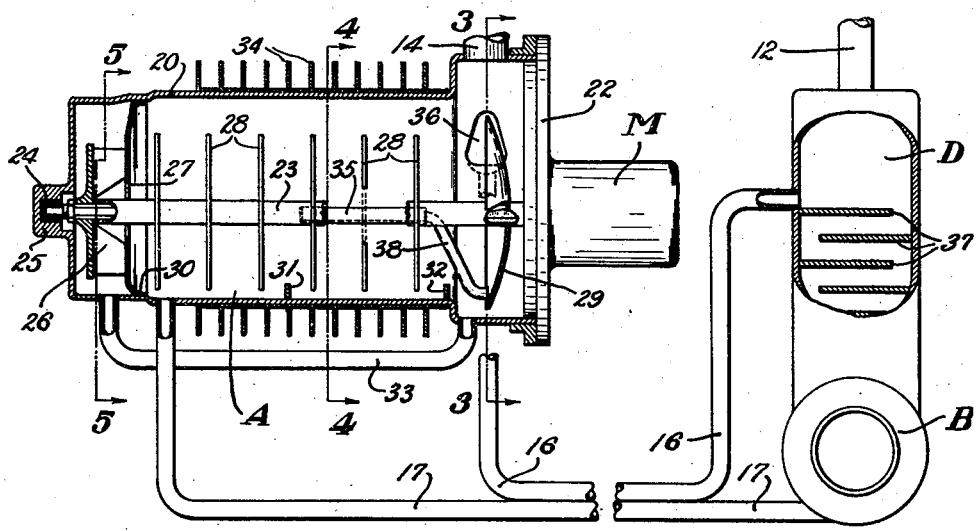
Figure 2 is an enlarged fragmentary view of the apparatus of Figure 1 showing the absorber in cross section and illustrating how it is connected to the boiler.

An important feature of the present invention is the means for causing the fluids to circulate within the absorber. As shown in Figures 1 and 2 the absorber may consist of a metal cylinder 20 disposed substantially horizontally and with an enlarged portion or sump at the right-hand end.

An electric motor M is mounted on the right-hand end of the cylindrical vessel 20 upon the end plate 22. The rotor of this motor may be hermetically sealed from the atmosphere in accordance with known practices, but may be caused to rotate as the result of magnetic fluxes transmitted through the walls surrounding the rotor, the field of the motor being mounted on the outside. Motors of this type are well known and need not be described here in detail.

The electric motor is mounted on and causes rotation of a horizontally extending shaft disposed slightly below the center line of the cylinder 20 as shown at 23. This shaft may be supported in suitable bearings 24, one of which, not shown, may be in the end plate 22 and the other of which may be in the left-hand cup or bearing support 25 welded or otherwise integrally secured to the left end of the cylinder 20.

One or more gas circulators may be mounted upon the shaft 23, the ararngement shown in Figure 2 illustrating a gas fan 26 of the double shrouded type and having a fan eye 27 and a number of blades which cause the gas to be driven out radially and discharged through the conduit 15 which connects the left-hand end of the absorber vessel 20 to the evaporator as described above.

The shaft 23 also carries a number of rotating discs 28 which may be secured to the shaft by means of spacing rings or the like and which are adapted to dip into the pools of liquid formed along the lower portion of the absorber vessel 20. These discs splash this liquid about the entire interior of the absorber.

The shaft also carries at its right-hand end a concave disc 29 of a somewhat larger diameter than the discs 28, the disc 29 being adapted to dip into the enlarged portion of the cylinder 20 at the right-hand end and lift liquid from the level of the lower portion thereof to splash it about the interior of the absorber and to act as a pump as will presently be described.

The interior of the absorber vessel also includes a partition or spacing ring 30 adjacent the shroud of the fan 26 and a number of dams or weirs along the lower portion of the absorber vessel 20 as indicated at 31 and 32. The elements 31 and 32 aid in maintaining pools of liquid at the proper level in the absorber vessel to enable the rotating elements 28 to operate properly in throwing liquid about the interior of the absorber vessel. As shown in Figure 2, a liquid conduit or drain pipe 33 connects the chamber in which the fan 26 is located to the sump or enlarged part of the cylinder 20 at the right-hand end thereof, so that any liquid that may find its way into the fan chamber will be drained into the lower part of the absorber.

Figure 3:
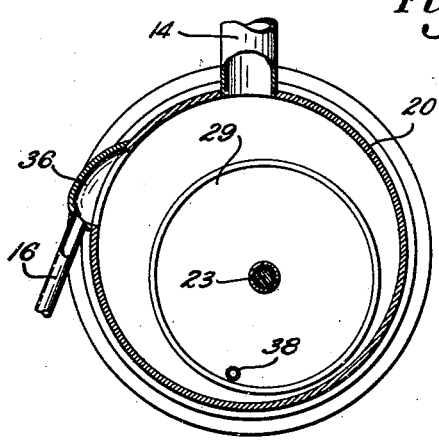
Figure 3 is a transverse cross sectional view of the absorber shown in Figure 2, the view being taken on line 3—3 of Figure 2.
Figure 4:
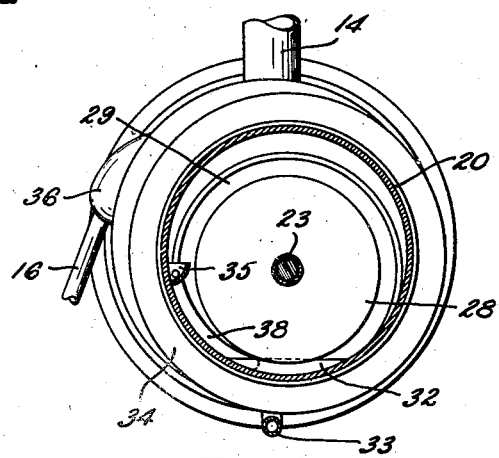
Figure 4 is a transverse cross sectional view of the absorber shown in Figure 2, the view being taken on line 4—4 of Figure 2.
Figure 5:
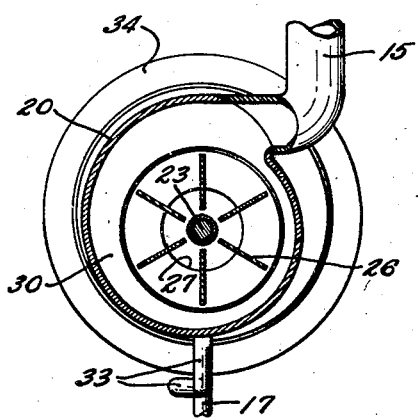
Figure 5 is a transverse cross sectional view of the absorber shown in Figure 2, the view being taken on the line 5—5 of Figure 2.

For transferring heat from the absorber to the atmosphere, a number of heat radiating fins 34 may be provided on the outside thereof in accordance with known constructions. At the back of the absorber, as viewed in Figure 2, and at the left-hand side thereof, as viewed in Figures 3 and 4, liquid catching devices or pockets are formed as illustrated at 35 and 36. As shown in Figure 2, the liquid catch basin 35 is adjacent the three right-hand discs 28 in the absorber and is adapted to catch some of the liquid thrown up by these three discs. The catching cup or pocket 36 is formed by welding an enlarged end of the pipe 16 to the outside of the vessel 20 at a point radially spaced from the disc 29 and slightly above the center of rotation thereof as illustrated in Figures 2, 3 and 4. This pocket 36 is adapted to receive liquid thrown up by the disc 29 and convey it into the boiler-analyzer system through the conduit 16. The conduit 16 may be connected to the analyzer D above the baffle plates 37 therein. These baffle plates serve to provide an extensive vapor-liquid contact area to promote the analyzing action.

The catch basin 35 is drained through a conduit 38 to a point adjacent and immediately above the lower rim of the disc 29 on the concave side thereof as illustrated in Figure 2.

In operation the boiler absorber system is filled with absorption solution to a level substantially along the top of the baffle plates 31 and 32 in the absorber and completely filling the boiler. Upon operation or rotation of the shaft 23, liquid is splashed about in the interior of the absorber in the form of sheet-like sprays and the large concave disc 29 pumps solution from the sump or enlarged part of the absorber vessel 20 into the pocket 36. From there, the liquid is conveyed through the conduit 16 into the analyzer D. After trickling downwardly over the baffle plates 37 in the analyzer, the liquid goes through the boiler and back to the absorber through the conduit 17 entering the absorber near the left-hand end thereof. The liquid overflows the first weir or dam 31 and is then sprayed and thrown by the right-hand discs 28 up into the catch basin 35. As the liquid is thrown about by the discs 28 it comes into intimate contact with the gas being circulated through the absorber under the action of the gas fan 26, thus causing complete absorption and aiding in the transfer of heat from the absorber through the heat-radiating fins 34 to the atmosphere. The liquid collecting in the catch basin 35 flows downwardly through the conduit 38 and except for starting and stopping of the machine practically all of the liquid which flows through the conduit 38 will be lifted into the catch basin or cup 36 to complete its cycle.

The arrangement of the various parts of the refrigerator within the cabinet will now be described. The cabinet is indicated generally at 40 and it comprises a cooling compartment 41 which is completely surrounded by insulated walls of the cabinet and a heavily insulated door 42. A mechanism compartment 43 extends beneath the bottom wall of the cooling chamber 41 and an air cooling duct 44 extends upwardly along the rear insulated wall of the compartment 41 and terminates in the compartment 43. The boiler-analyzer assembly extends lengthwise of the compartment 43 with the gas burner G at the front end thereof so that it is readily accessible from the front door opening to the compartment 43. The boiler-analyzer system is completely encased in a heavy block of insulating material 48 and is provided with a flue 49 for disposing of the products of combustion in the burner. The flue 49 extends upwardly through the air cooling duct 44 and terminates adjacent the top portion thereof. Any suitable flue distributing element may be attached to the upper portion of the flue 49 if desired. The absorber A extends transversely of the compartment 43 at the rear thereof directly beneath the bottom portion of the air cooling duct 44. The rectifier R is positioned in the top central portion of the air cooling duct 44 in position to be swept by cooling air flowing therethrough and the condenser C is positioned in the extreme upper portion of the duct 44 also to be swept by cooling air passing therethrough. The evaporator E and the box cooling section 11 thereof are mounted in the top portion of the cooling chamber 41 to provide a means for cooling that chamber and for producing ice cubes. The gas heat exchanger H is enclosed in an insulating blanket 45 which is partially embedded in the rear insulated wall of the cooling compartment 41. The cabinet 40 is supported upon a base element 47 which is constructed with short corner supports whereby to permit cooling air to flow therethrough into the compartment 43. If desired, suitable air inlet louvres 50 may be formed in the rear panel below the absorber to admit additional cooling air.

Cooling air which flows into the compartment 43 passes over the absorber A abstracting the heat of absorption from the numerous fins 34 which are provided on the exterior surface of the cylinder 20 and then passes upwardly through the cooling duct 44 over the rectifier R and condenser C in the order named. From this it is apparent that a single stream of cooling air passes serially over the absorber, rectifier and condenser, abstracting the heat of absorption, the heat of rectification and the heat of condensation in the order named. Due to the fact that this air stream is periodically heated in the air flue 44, a vigorous thermosyphonically induced air circulation is maintained through that flue thereby insuring complete and adequate cooling of the refrigerating system as a whole.

It will be noted that the absorber is positioned directly beneath the bottom portion of the flue 44 but that no portion of the absorber or absorber cooling mechanism is mounted in that flue; as a result of this construction, the flue 44 may be made relatively very shallow thereby effecting an appreciable saving in space; the flue 44 need only be deep enough to accommodate the condenser, rectifier and products of combustion flue and with sufficient space to provide the requisite quantity of cooling air.

It is apparent from an inspection of Figure 1 that the absorber is substantially co-extensive with the top portion of the analyzer. This is a highly desirable construction because it permits the mechanism compartment 43 to be made very shallow; this compartment may be only slightly higher than the boiler-analyzer system. This desirable construction is possible because of the fact that the bottom portion of the absorber is positioned below the liquid level normally prevailing in the boiler analyzer system and the absorber is positioned horizontally. As a result of this construction, the absorption solution flows by gravity from the boiler into the absorber wherein it is formed into a spray and passes through the absorber. When the solution reaches the circulating disc pump 29, it is elevated into the pocket member 36 which is slightly higher than the junction between the analyzer and the conduit 16 whereby such liquid then flows through the conduit 16 by gravity.

The present absorber structure differs radically from previous structures because it need not extend appreciably above the boiler-analyzer system. In previous constructions, the absorber was either positioned vertically or in an inclined position and the lowest points of the absorber had to be higher than the highest points of the boiler analyzer system in order that the absorption solution might flow from the bottom portion of the absorber into the top portion of the analyzer. With the present system the mechanism compartment need only be high enough to accommodate the boiler-analyzer with sufficient clearance for the necessary conduits because of the fact that the absorption solution flows through a horizontal absorber at a level corresponding to the liquid level normally maintained in the boiler and is then elevated in the absorber into an upstanding conduit through which it may flow by gravity into the top portion of the analyzer.

It is apparent from the description above that the present invention provides an absorber which is characterized by the fact that it is very compact, may be positioned in a horizontal position, may be positioned substantially on a level with the boiler-analyzer system, positively propels all fluids through their respective circuits, rejects the heat of absorption, and provides highly efficient gas and liquid contact apparatus.

In addition to the various desirable and advantageous features above noted, the present absorber provides highly efficient absorption because of the fact that each individual particle of absorption solution is brought into contact in a finally divided state with the gas stream a plurality of times and at a plurality of points within the absorber vessel. This follows from the fact that the trough 35 actually receives only a very small portion of the liquid formed into a spray by the discs 28 and the balance of the liquid simply strikes the interior wall of the cylinder 20 to impart thereto the heat of absorption after which it returns to the bottom portion of the cylinder 20 to be recirculated by the discs. This has a dual advantage for the reason of the fact that only a very small quantity of liquid actually should be circulated per unit of time through the boiler-analyzer absorber system. Nevertheless it is desirable to present a very great area of absorption solution to the pressure equalizing medium refrigerant vapor mixture passing through the absorber in order to remove from that mixture the refrigerant vapor content thereof.

The cooling air entering the compartment 43 has a substantially straight line flow path over the absorber and through the cooling air flue. Nevertheless the air stream must pass over the entire absorber body because of its position transversely of the compartment 43 and directly beneath the air flue 44.

The compact arrangement of the boiler and absorber flows in part from the fact that the weak solution flows by gravity into the absorber and the strong solution is then elevated into the analyzer.

While only one embodiment of the invention has been shown and described herein, it is obvious that many changes may be made in the arrangement and construction of parts without departing from the spirit of the invention or the scope of the annexed claims.

I claim:

1. Absorption refrigerating apparatus comprising a cabinet including a cooling chamber, a mechanism compartment below said chamber, and a cooling air flue extending along one wall of said chamber and opening into said compartment, refrigerating mechanism in said compartment including an air cooled condenser mounted in the upper portion of said flue, an absorber extending transversely of said compartment and positioned to be swept by cooling air flowing thereinto, and cooling fins on said absorber, said absorber having a drive motor on one end thereof and a circulating fan in the opposite end thereof, and a boiler assembly connected in circuit with said absorber and positioned outside the path of flow of the cooling air traversing said absorber.

2. Refrigerating apparatus comprising a boiler-analyzer, an absorber, means for flowing weak solution to said absorber by gravity, said absorber comprising a substantially horizontal vessel, air cooling fins on said vessel, means within said vessel for forming pools of absorption solution, power driven means within said vessel including means for creating sprays from the liquid within said pool, means for propelling refrigerant vapor to be absorbed through said sprays, and means for lifting strong solution formed in said vessel to an elevation from which it may flow into said analyzer by gravity.

3. Absorption refrigerating apparatus comprising a solution circuit including a boiler-analyzer and an absorber, a pressure equalizing medium circuit including an evaporator and said absorber, means for supplying refrigerant vapor generated in said boiler to said evaporator in liquid phase, said absorber comprising a horizontal vessel having the bottom portion thereof positioned below the liquid level normally prevailing in the boiler-analyzer system and the top portion thereof substantially coextensive with the top portion of said boiler-analyzer, power driven means hermetically sealed within said absorber including means for circulating pressure equalizing medium through said pressure equalizing medium circuit, means for circulating solution through said solution circuit, and for bringing said solution and pressure equalizing medium into intimate contact.

4. Refrigerating apparatus comprising a cabinet including an insulated cooling chamber, a shallow mechanism compartment beneath said chamber and a vertically extending cooling flue, refrigerating apparatus in said cabinet including an air cooled condenser in said flue, an evaporator in said chamber and a boiler and an absorber in said compartment, means connecting said boiler and absorber to form an absorption solution circuit, said absorber comprising a horizontal vessel positioned with the bottom portion thereof below the upper portion and to one side of said boiler, and power driven means within said absorber constructed and arranged to create sprays from the solution flowing thereto and to circulate the solution through said circuit.

5. Refrigerating apparatus comprising a cabinet including an insulated cooling chamber, a shallow mechanism compartment beneath said chamber and a vertically extending cooling flue, refrigerating apparatus in said cabinet including an air cooled condenser in said flue, an evaporator in said chamber and a boiler and an absorber in said compartment, means connecting said boiler and absorber to form an absorption solution circuit, said absorber consisting of a hermetically sealed horizontally positioned vessel and power driven means associated with said vessel for circulating inert gas and gas to be absorbed through said vessel and for circulating absorption liquid through said vessel, said liquid circulating means comprising a plurality of discs mounted for rotation upon a substantially horizontal shaft, and a plurality of liquid catching devices adjacent said discs for catching liquid thrown off therefrom, one of said devices discharging liquid into said solution circuit.

6. An absorber adapted for use in an absorption refrigerating system of the type in which an inert gas is employed as a pressure equalizing medium, said absorber consisting of a hermetically sealed vessel and power driven means associated with said vessel for circulating inert gas and gas to be absorbed through said vessel and for circulating absorption liquid through said vessel, said liquid circulating means comprising a plurality of discs mounted for rotation upon a substantially horizontal shaft, and a plurality of liquid catching devices adjacent said discs for catching liquid thrown radially therefrom, one of said devices leading to a point exterior to said vessel.

7. An absorber adapted for use in a continuous absorption refrigerating system of the type in which an inert gas is employed as a pressure equalizing medium, said absorber consisting of a hermetically sealed vessel and power driven means associated with said vessel for circulating inert gas and gas to be absorbed through said vessel and for circulating absorption liquid through said vessel, said liquid circulating means comprising a plurality of discs mounted for rotation upon a substantially horizontal shaft, and a plurality of liquid catching devices adjacent said discs for catching liquid thrown off therefrom, one of said catching devices having means connected thereto for transferring liquid therefrom to a point adjacent one of said discs, and another of said devices serving to convey enriched absorption liquid away from said vessel by gravity.

8. An absorber adapted for use in a continuous absorption refrigerating system of the type in which an inert gas is employed as a pressure equalizing medium, said absorber consisting of a hermetically sealed vessel and power driven means associated with said vessel for circulating inert gas and gas to be absorbed through said vessel and for circulating absorption liquid through said vessel, said liquid circulating means comprising a plurality of discs mounted for rotation upon a substantially horizontal shaft, and a plurality of liquid catching devices adjacent said discs for catching liquid thrown off therefrom, one of said discs being slightly concave and having means associated therewith for supplying liquid to be pumped thereby to a point immediately above the lower edge of the disc and on the concave side thereof.

9. An absorber adapted for use in a continuous absorption refrigerating system of the type in which an inert gas is employed as a pressure equalizing medium, said absorber consisting of a hermetically sealed vessel and power driven means associated with said vessel for circulating inert gas and gas to be absorbed through said vessel and for circulating absorption liquid through said vessel, said liquid circulating means including dams or weirs along the lower side of said vessel for forming pools of liquid, a plurality of discs mounted for rotation upon a substantially horizontal shaft and so disposed as to dip into said pools and liquid catching devices adjacent said discs and above the liquid levels of the pools for catching liquid thrown off by said discs, at least one of said devices leading to a point outside said vessel for carrying away the enriched absorption fluid.

10. An absorber adapted for use in a continuous absorption refrigerating system of the type in which an inert gas is employed as a pressure equalizing medium, said absorber consisting of a hermetically sealed vessel and power driven means associated with said vessel for circulating inert gas and gas to be absorbed through said vessel and for circulating absorption liquid through said vessel, said liquid circulating means including dams or weirs along the lower side of said vessel for forming pools of liquid, a plurality of discs mounted for rotation upon a substantially horizontal shaft and so disposed as to dip into said pools and liquid catching devices adjacent said discs and above the liquid levels of the pools for catching liquid thrown off by said discs, one of said catching devices having means connected thereto for transferring liquid therefrom to a point adjacent one of said discs, and another of said catching devices leading to a point outside said vessel.

11. Absorption refrigerating apparatus comprising a solution circuit including a boiler-analyzer and an absorber, a pressure equalizing medium circuit including an evaporator and said absorber, means for supplying refrigerant vapor generated in said boiler to said evaporator in liquid phase, said absorber comprising a horizontal vessel having the bottom portion thereof positioned below the liquid level normally prevailing in the boiler-analyzer system and the top portion thereof substantially coextensive with the top portion of said boiler-analyzer, and means for circulating the absorption solution through said boiler-analyzer and said absorber.

12. Refrigerating apparatus comprising a cabinet including an insulated cooling chamber, a shallow mechanism compartment beneath said chamber and a vertically extending cooling flue, refrigerating apparatus in said cabinet including an air-cooled condenser in said flue, an evaporator in said chamber and a boiler-analyzer and an absorber in said compartment, means connecting said boiler-analyzer and absorber to form an absorption solution circuit, said absorber consisting of a substantially horizontal finned vessel positioned to be swept by air flowing into said flue, the bottom portion of said absorber being connected to receive weak absorption solution from said boiler-analyzer by gravity, and means for conveying strong absorption solution from said absorber into said analyzer.

13. Absorption refrigerating apparatus comprising a cabinet including a cooling chamber, a mechanism compartment below said chamber, and a cooling air flue extending along one wall of said chamber and opening into said compartment, refrigerating mechanism including an air cooled condenser mounted in the upper portion of said flue, a substantially horizontal absorber vessel provided with vertically extending cooling fins positioned in said compartment and transversely thereof directly beneath said flue to be swept by cooling air flowing into said flue, a fluid circulator in said vessel, and a drive motor for said fluid circulator mounted on said vessel in position to be swept by cooling air flowing into said flue, and a boiler assembly connected in circuit with said absorber and positioned outside the path of flow of the cooling air traversing said absorber.

DONALD G. SMELLIE.